United States Patent [19]

Piteo, Jr. et al.

[11] 4,305,610

[45] Dec. 15, 1981

[54] DEFEATABLE INTERLOCK FOR FUSE ACCESS DOOR

[75] Inventors: Benjamin A. Piteo, Jr.; Frederick D. Kaufhold, both of Forestville, Conn.

[73] Assignee: General Electric Company, New York, N.Y.

[21] Appl. No.: 103,126

[22] Filed: Dec. 13, 1979

[51] Int. Cl.³ .............................................. E05C 1/04
[52] U.S. Cl. .................................. 292/152; 200/50 A; 361/344; 361/357
[58] Field of Search ....................... 292/148, 153, 152; 200/50 A; 361/344, 357, 347, 336

[56] References Cited

U.S. PATENT DOCUMENTS 3,609,261  9/1971  Rys .................................... 200/50 A
4,071,722  1/1978  Hart ................................... 200/50 A
4,107,488  8/1978  Keller et al. ......................... 200/50 A

FOREIGN PATENT DOCUMENTS 616993  1/1949  United Kingdom ................ 292/148

Primary Examiner—Richard E. Moore
Attorney, Agent, or Firm—Richard A. Menelly; Walter C. Bernkopf; Philip L. Schlamp

[57] ABSTRACT

A fuse access door of a fusible switch enclosure is held closed by a latch slidably mounted thereto. A resilient interlock actuator secured to the door cooperates with a defeatable switch interlock arm to enable switch closure only while the door is closed and to interlock the latch against unlatching movement while the switch is closed. However, depression of the interlock arm via the interlock actuator defeats this interlock to permit access to the fuses while the switch is closed.

8 Claims, 6 Drawing Figures

4,305,610

DEFEATABLE INTERLOCK FOR FUSE ACCESS DOOR

BACKGROUND OF THE INVENTION

Electrical switchboards and other forms of electrical enclosures are typically constructed with cubicle or enclosure access doors having openings through which the electrical switching device operating handles extend for convenient manual operation by personnel without the necessity of opening the access doors. As a safety precaution, it is common practice to equip such enclosures with interlocks functioning to prevent or at least discourage opening of the access door unless and until the switching device therein is open, i.e., OFF.

There are occasions however when it would be most advantageous, if not an absolute necessity, from the standpoint of avoiding disruption of electrical service, for maintenance personnal to gain access to the enclosure without first having to open the switching device. As a consequence, these door interlocks should somehow be defeatable. One way of accomplishing this would be to install the interlock in a manner such that it can be completely removed. This is not a particularly attractive recourse in view of the time and effort required of authorized maintenance personnel. Moreover, defeating the door interlock by its complete removal would be a readily apparent recourse to unauthorized personnel bent on access to the enclosure, and thus any facility in doing so would detract from the intended purpose of discouraging unauthorized access while the switching device is closed. Thus, for the interlock to be effective for its intended purpose, defeatability should be unobvious to uninformed personnel, regardless of whether it is convenient or not.

It is accordingly an object of the present invention to provide a door interlock for effectively discouraging access to an electrical enclosure while the switching device therein is closed, and yet is readily defeatable by informed, authorized personnel.

A further object of the present invention is to provide a door interlock of the above character which is equipped with unobtrusive interlock defeating provision.

Yet another object of the present invention is to provide an interlock of the above character having provisions preventing closure of the switching device while the access door is open.

An additional object is to provide a door interlock of the above character which is simple in construction, economical to manufacture, reliable in service, convenient to operate by operating personnel in its undefeated condition and readily defeatable by informed maintenance personnel.

Other objects of the invention will in part be obvious and in part appear hereinafter.

SUMMARY OF THE INVENTION

In accordance with the present invention, there is provided an interlock for controlling an access door to an electrical enclosure in accordance with the condition of an electrical switching device situated therein. The interlock includes a latch and a handle pinned together and slidably mounted to opposite sides of an access door. Situated in a slot in the door and captured between the latch and handle is a compression spring biasing the latch to its latching position engaging a door stop when the door is closed. Affixed to the door is a resilient interlock actuator which cooperates with an interlock arm carried by the switching device for movement between ON and OFF positions in response to articulation of the switching device operating mechanism between switch closed and open conditions, respectively, by a manual operating handle accessible externally of the enclosure. Specifically, the interlock actuator is configured to provide a bump positioned to engageably depress the interlock arm in its OFF position when the door is closed; such depression freeing the switch device operating mechanism for articulation to its switch closed condition. The interlock actuator is further configured adjacent its deflectable end to provide a groove receiving the interlock arm in its ON position. This groove is effective in supporting the interlock arm in its ON position such that it can provide a positive stop obstructing sliding movement of the latch to its unlatching position. Thus, the switching device can not be closed unless the door is closed, and the door can not normally be opened unless the switching device is first opened.

To defeat the interlock preventing access to the enclosure with the switching device closed, the door is provided with an inconspicuous slot immediately in front of the interlock actuator for accommodating the insertion of a suitable tool, such as a screwdriver, to depress the deflectable end of the interlock actuator. Since the interlock arm in its ON position is accommodated in the interlock actuator groove, insertion of the screwdriver also depresses the interlock arm out of interference with movement of the latch to its unlatching position. The door may then be unlatched and opened without first opening the switching device.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which.

Corresponding reference numerals refer to like parts throughout the several views of the drawings.

DETAILED DESCRIPTION

Figure 1:
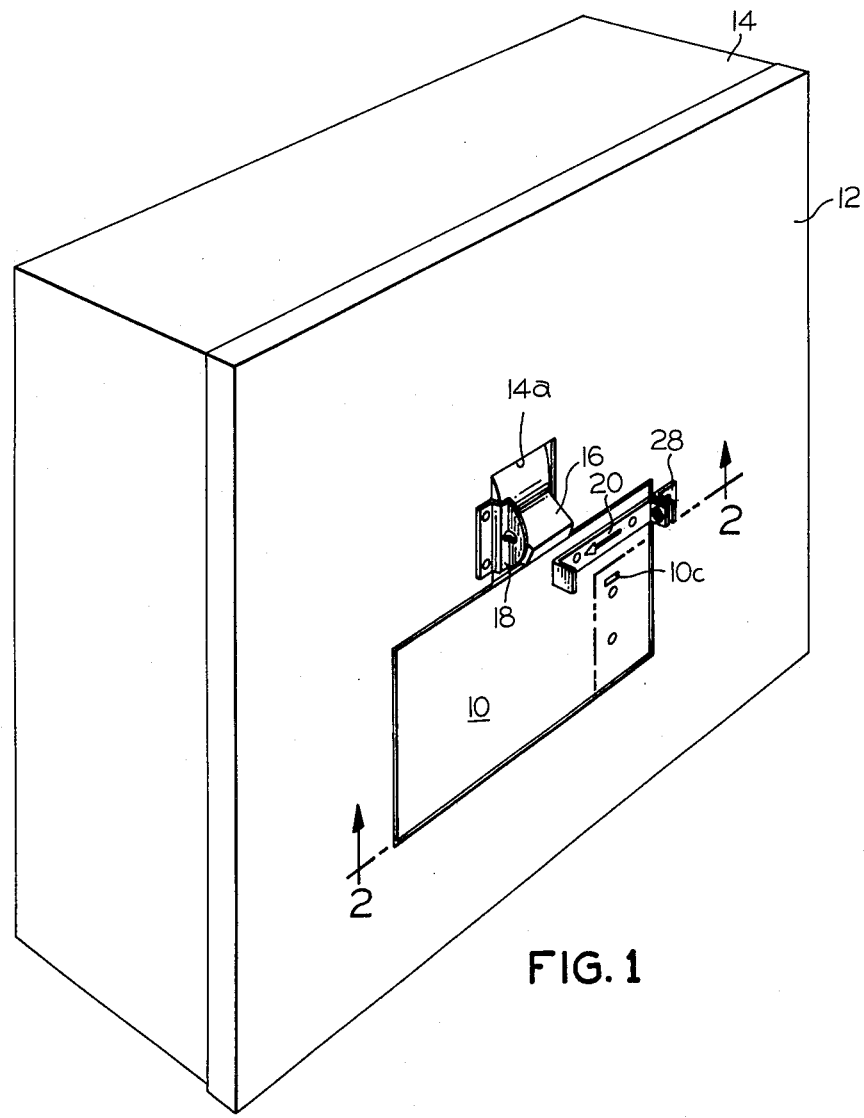
FIG. 1 is a perspective view of an electrical enclosure equipped with an access door interlock constructed in accordance with the present invention.

The access door interlock of the present invention is illustrated in FIG. 1 as being applied to a fuse access door 10 provided in the front cover 12 of an electrical enclosure 14. The cover is further provided with an opening 14a through which protrudes the manually operating handle 16 of a fusible switch. A bracket 18, secured to cover 12 adjacent opening 14a, is apertured to receive the shackle of a padlock (not shown) effective in locking handle 16 in its downward, OFF position or its upward, ON position.

Figure 2:
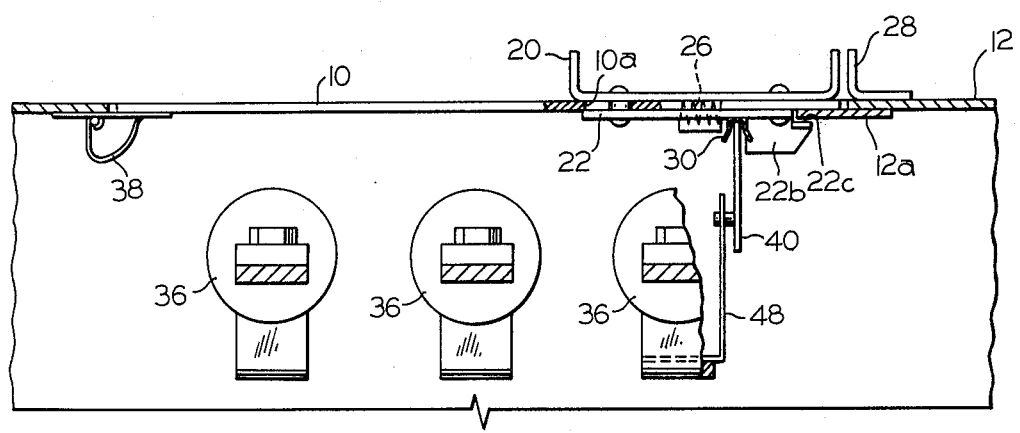
FIG. 2 is a sectional view taken along line 2—2 of FIG. 1.
Figure 3:
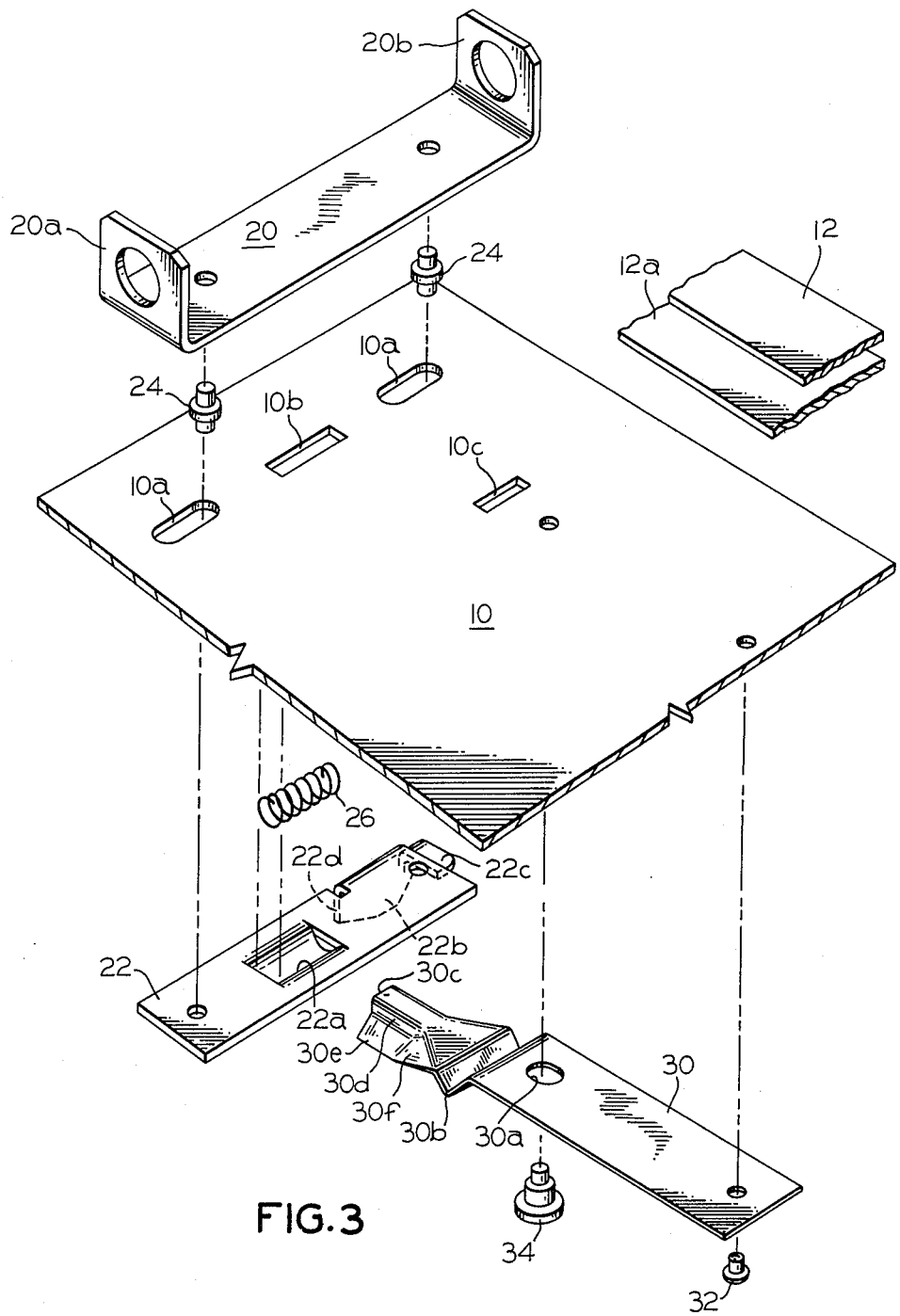
FIG. 3 is an exploded perspective view of the door mounted portion of the access door interlock of the present invention.

Turning to FIG. 3, the access door interlock is seen to include a handle plate 20 disposed on the front side of door 10 and a latch plate 22 disposed on the back side of the door. These two plates are united with shouldered rivets 24 extending through laterally elongated slots 10a in door 10 such as to be mounted to the door for limited sliding movement between a rightward, latching position and a leftward, unlatching position as viewed in FIG. 2. Latch plate is lanced and drawn to provide a pocket 22a which is aligned with a laterally elongated slot 10b in door 10 with the latch plate in its latching position. A compression spring 26 is captured in this pocket between the handle plate and the latch plate and acts between the door and the latch plate in biasing the latter to its latching position.

Adjacent its right end, latch plate is formed with a rearwardly turned flange 22b which carries a frontally turned latching shoulder 22c seen to be offset rearwardly from the planar body of the latch plate. As seen in FIG. 2, with the latch plate in its latching position, its latching shoulder engages the back side of a perimetrical door stop strip 12a secured to cover 12 and protruding into the door opening to underlap door 10 in its closed position. The right edge of flange 22b is angled back from latching shoulder 22c such that, upon closure of door 10, this edge engages the edge of stop strip 12a, causing the latch plate to be cammed leftward to its unlatching position against the bias of spring 26. When the door is fully closed, this spring returns the latch plate to its latching position with latching shoulder 22c in latching engagement with stop strip 12a. Thus, door 10 is secured in its closed position in self-latching fashion incident with closure, i.e., without manipulation of handle 20. The left end portion 20a of the handle is turned outwardly to facilitate digital manipulation. The handle right end portion 20b is similarly turned outwardly and apertured to cooperate with a cover mounted, apertured bracket 28 (FIGS. 1 and 2) in padlocking door 10 in its closed and latch position.

Still referring to FIG. 3, an interlock actuator 30, formed of spring steel strip stock, is secured adjacent its lower end to door 10 by a rivet 32. A headed and shouldered rivet 34, secured to the door, projects through a clearance hole 30a in interlock actuator 30, such that the actuator is afforded limited, deflecting movement rearwardly away from the back side of the cover. Yet, these rivets serve to rigidly maintain the right angular orientation of the interlock actuator to the latch plate and handle assembly. Upwardly beyond hole 30a, the interlock actuator is deformed to provide a transversely extending, rearwardly protruding ridge or bump 30b. The free upper end portion of the interlock actuator is provided with a rearwardly facing, vertically extending, narrow groove 30c having short perpendicular sidewalls 30d terminating in rearwardly diverging wings 30e. The groove sidewalls and wings merge into the body of the interlock actuator via laterally diverging flares 30f. The purposes served by this free end configuration of interlock actuator 30 will be explained in the description to follow.

Figure 4:
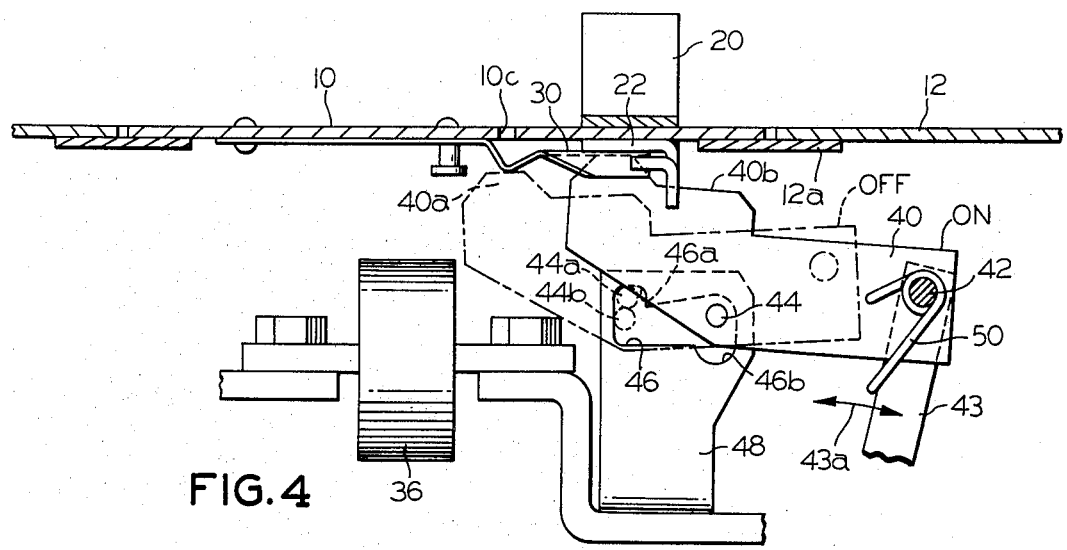
FIG. 4 is a sectional side elevational view of the access door interlock of the present invention.
Figure 6:
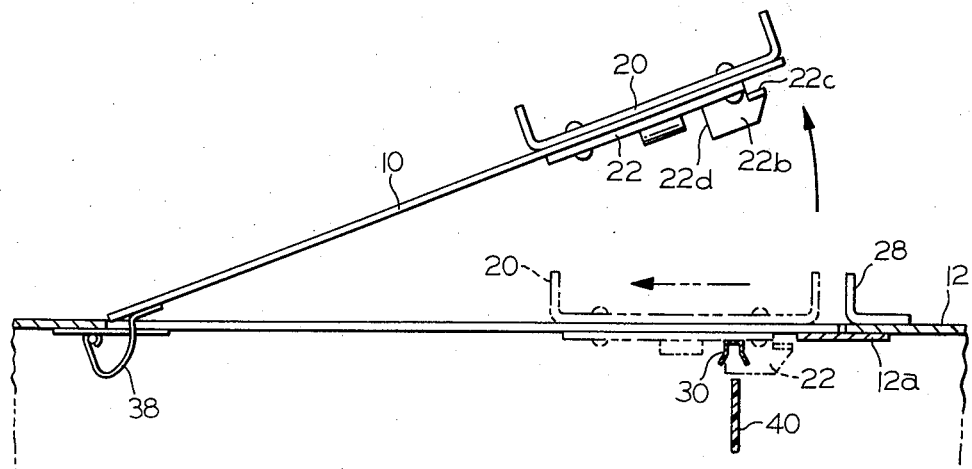
FIG. 6 is a sectional plan view of the access door interlock of the present invention, seen with the door open.

As mentioned in connection with FIG. 1, handle 16 is the manual operating handle of a fusible switch having fuses 36, seen in FIG. 4, rendered accessible via door 10 which is hinged to enclosure cover 12 as indicated at 38 in FIGS. 2 and 6. Thus handle is manipulated to articulate a switch operating mechanism (not shown) pursuant to effecting opening and closing of the switch. As seen in FIG. 4, an interlock arm 40 is pivotally mounted adjacent its right end to a pin 42 carried by a lever 43 coupled with the switch operating mechanism. As the switch operating mechanism is articulated by handle 16 between its open and closed conditions, lever 43 is swung through an arc, indicated by arrow 43a, to respectively shift the interlock arm between its phantom line OFF position and its solid line ON position. A pin 44 carried by interlock arm 40 is received in a vertically elongated slot 46 formed in an outstanding bracket 48 mounted by the switch. The lower end (left end in FIG. 4) of this slot is provided with a forwardly extending notch 46a, while the other or upper end thereof is provided with a rearwardly extending recess 46b.

Still referring to FIG. 4, while the switch is open and thus the interlock arm is in its phantom line OFF position, closure of door 10 brings bump 30b formed in interlock actuator 30 into engagement with a nose 40a provided in the free end portion of interlock arm 40. This engagement depresses the interlock arm rearwardly against the bias of a spring 50, thereby moving pin 44 from its phantom line position 44a to its phantom line position 44b. This action is seen to duck pin 44 out of notch 46a into the elongated portion of slot 46. Under these circumstances, this pin can move freely through the slot as the interlock arm is moved to its ON position in response to articulation of the switch operating mechanism to its switch closed condition by manual operating handle 16 (FIG. 1). On the other hand, if the door is open while the switch is open and thus interlock arm 40 is in its OFF position, spring 50 is free to pivot the lower end of the interlock arm forwardly to swing pin 44 to its position 44a lodged in notch 46a. It is thus seen that the interlock arm is now restrained from movement to its ON position, and this restraint is effective in inhibiting articulation of the switch operating mechanism to its switch closed condition by handle 16. This restraint is automatically removed incident with closure of door 10. Thus, the interlock of the present invention serves to prevent closure of the switch unless and until door 10 is closed.

When the switch is closed, it is seen that nose 40a of the interlock arm moves upwardly off bump 30b and into groove 30c; its movement thereunto being guided by flares 30f (FIG. 3) formed in the interlock actuator. Spring 50 maintains nose 40a bottomed in this groove while the interlock arm is in its ON position. While in this position a raised edge portion 40b (FIG. 4) of the interlock arm is stationed in interfering relation with an edge 22d of flange 22b carried by latch plate 22 (FIG. 3) as seen in FIG. 2. Consequently, latch plate 22 cannot be moved to its unlatching position by latch handle 20 to permit opening of the fuse access door while the interlock arm is in its ON position. Thus access to fuses 36 is normally denied while the switch is closed.

Since nose 40a is accommodated in groove 30c, the straight sides 30d thereof resist lateral displacement of the interlock arm, thus successfully discouraging forcible attempts to unlatch door 10. Of course, when the switch is opened, edge 40b of the interlock is ducked below the latch plate flange 22b, thus removing its inhibition to unlatching movement of the latch plate by the latch handle.

Figure 5:
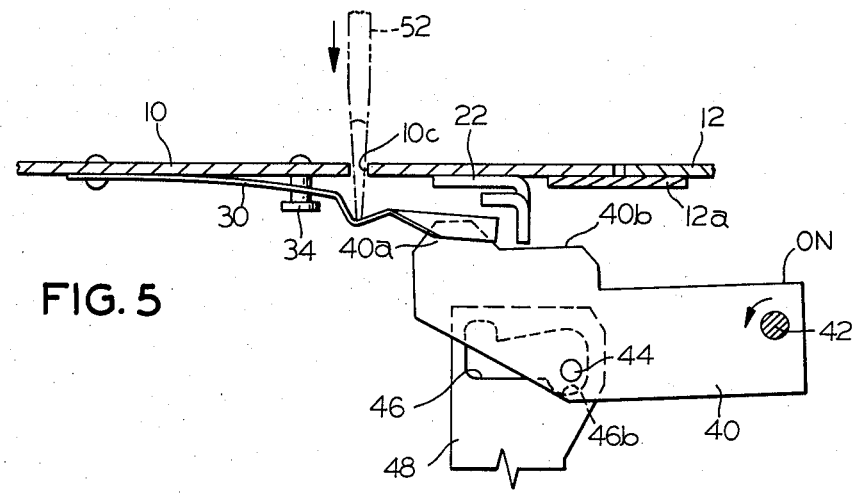
FIG. 5 is a sectional side elevational view of the access door interlock of the present invention, seen in its defeated condition.

To defeat the interlock preventing fuse access while the switch is closed, door 10 is provided with a small, inconspicuous slot 10c (FIGS. 1 and 5) located immediately in front of interlock actuator 30. This slot admits the tip of a suitable tool, such as a screw driver 52 seen in FIG. 5, for the purpose of engageably deflecting the free end of the interlock actuator rearwardly to the extent permitted by the head of rivet 34. This also swings the free end of the interlock arm sufficiently rearwardly to back edge 40b thereof out of interfering relation with latch plate flange 22b, whereupon the latch may be slid to its unlatching position to open door 10 and access fuses 36 with the switch closed. Recess 46b in slot 46 provides clearance for pin 44 while the interlock is being defeated. Door 10 may be reclosed while the switch remains closed; the wings 30e on interlock actuator 30 serving to guide nose 40a back into groove 30c. Of course, there is nothing to prevent the switch from being opened prior to reclosure and relatching of the fuse access door. It will be noted that the interlock actuator limits the extent of screwdriver penetration so as to preclude inadvertent contact with live switch parts.

While the foregoing disclosure is directed to a defeatable interlock for a fuse access door, it will be appreciated that the teachings of the present invention can be readily applied to a defeatable interlock for an electrical enclosure door accessing the entire switch or circuit breaker situated therein.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A defeatable interlock for an access door to an electrical enclosure containing a switching device having a manual operating handle connected with the switch operating mechanism and protruding through an opening in the enclosure to facilitate articulation of the operating mechanism between its switch open and switch closed conditions, said defeatable interlock comprising, in combination:

A. a latch mounted to the rear side of the access door for movement between a latching position and an unlatching position;

B. a latch handle connected with said latch and disposed on the front side of the access door to accommodate manual movement of said latch between its latching and unlatching position;

C. a resilient interlock actuator mounted to the rear side of the access door in perpendicular relation to the path of movement of said latch between its latching and unlatching positions, said interlock actuator having a rearwardly deflectable free end portion;

D. an interlock arm coupled with the switch operating mechanism for movement between an ON position and an OFF position in concert with the articulation of the switch operating mechanism between its closed and open conditions, respectively, in its ON condition, said interlock arm interfering with movement of said latch from its latching position to its unlatching position thereby preventing opening of the access door with the switch operating mechanism in its closed condition, said interlock arm in its OFF position being controlled by said interlock actuator to prevent articulation of the switch operating mechanism to its closed condition while the access door is open; and E. means forming an interlock defeat slot in the access door accommodating the insertion of a tool effective to rearwardly deflect said free end portion of said interlock actuator, said deflected actuator free end portion engageably moving said interlock arm in its ON position out of interfering relation with said latch, said latch then being moveable from its latching position to its unlatching position permitting opening of the access door with the switch operating mechanism in its closed condition.

2. The defeatable access door interlock defined in claim 1, wherein said free end portion of said interlock actuator is formed having a groove into which a nosed edge portion of said interlock arm is received upon assuming its ON position, said groove supporting said interlock arm in its position of interference with the movement of said latch from its latching position to its unlatching position.

3. The defeatable access door interlock defined in claim 2, wherein said free end portion of said interlock actuator is additionally formed having diverging sides flanking said groove for guiding said interlock arm nosed edge portion into said groove as said interlock arm is moved from its OFF position to its ON position and as the access door is closed with said interlock arm in its ON position.

4. The defeatable access door interlock defined in claim 1, wherein said interlock arm is pivotally connected adjacent one end to the switch operating mechanism with its other, free end spring biased forwardly toward the access door, in its OFF position, said spring bias orienting said interlock arm free end forwardly to lock said interlock arm against movement from its OFF position to its ON position, said interlock actuator being formed having a rearwardly facing protuberance positioned, upon closure of the access door, to engageably swing said interlock arm free end rearwardly and thereby unlock said interlock arm for movement to its ON position.

5. The defeatable access door interlock defined in claim 4, wherein said interlock arm carries a pin operating in a slot formed in a stationary member, said slot being elongated in the direction of movement of said interlock arm between its ON and OFF positions, said slot having a notch adjacent one end into which said pin is lodged when said interlock arm free end is oriented forwardly by said spring bias to lock said interlock arm in its OFF position.

6. The defeatable access door interlock defined in claim 4, wherein said free end portion of said interlock actuator is formed having a groove into which a nosed edge portion carried by said interlock arm free end is received upon assuming its ON position of interference with the movement of said latch from its latching position to its unlatching position.

7. The defeatable access door interlock defined in claim 6, wherein said free end portion of said interlock actuator is additionally formed having diverging sides flanking said groove for guiding said interlock arm nosed edge portion into said groove as said interlock arm is moved from its OFF position to its ON position and as the access door is closed with said interlock arm in its ON position.

8. The defeatable access door interlock defined in claim 7, wherein said interlock arm carries a pin operating in a slot formed in a stationary member, said slot being elongated in the direction of movement of said interlock arm between its ON and OFF positions, said slot having a notch adjacent one end into which said pin is lodged when said interlock arm free end is oriented forwardly by said spring bias to lock said interlock arm in its OFF position.

* * * * *